United States Patent
Kannan et al.

(10) Patent No.: US 11,080,721 B2
(45) Date of Patent: Aug. 3, 2021

(54) METHOD AND APPARATUS FOR AN INTUITIVE CUSTOMER EXPERIENCE

(71) Applicant: [24]7.ai, Inc., San Jose, CA (US)

(72) Inventors: Pallipuram V. Kannan, Los Gatos, CA (US); Ravi Vijayaraghavan, Bangalore (IN)

(73) Assignee: 7.ai, Inc., San Jose, CA (US)

( * ) Notice: Subject to any disclaimer, the term of this patent is extended or adjusted under 35 U.S.C. 154(b) by 820 days.

(21) Appl. No.: 13/862,002

(22) Filed: Apr. 12, 2013

(65) Prior Publication Data

US 2013/0282430 A1    Oct. 24, 2013

Related U.S. Application Data

(60) Provisional application No. 61/636,275, filed on Apr. 20, 2012.

(51) Int. Cl.
  *G06Q 30/00* (2012.01)
  *G06Q 30/02* (2012.01)
  *G06Q 30/06* (2012.01)

(52) U.S. Cl.
  CPC ............ *G06Q 30/02* (2013.01); *G06Q 30/06* (2013.01)

(58) Field of Classification Search
  CPC ........... G06Q 30/0255; G06Q 30/0235; G06Q 10/105; G06Q 10/103; G06Q 10/067; G06Q 30/02; G06Q 10/06315; G06Q 40/00; G06Q 30/00; G06Q 30/06; H04Q 7/20
  USPC .............................................. 705/7.11–7.42
  See application file for complete search history.

(56) References Cited

U.S. PATENT DOCUMENTS

| | | |
|---|---|---|
| 6,587,556 B1 | 7/2003 | Judkins et al. |
| 7,039,166 B1 | 5/2006 | Peterson et al. |
| 7,600,017 B2 | 10/2009 | Holtzman et al. |
| 7,631,007 B2 | 12/2009 | Morris |
| 7,673,340 B1 | 3/2010 | Cohen et al. |
| 8,140,703 B2 | 3/2012 | Morris et al. |
| 8,238,541 B1 | 8/2012 | Kalavar |
| 8,296,373 B2 | 10/2012 | Bosworth et al. |
| 8,370,155 B2 | 2/2013 | Byrd et al. |
| 8,488,774 B2 | 7/2013 | Mahalaha et al. |

(Continued)

FOREIGN PATENT DOCUMENTS

| | | |
|---|---|---|
| CN | 101190941 A | 6/2008 |
| WO | 9407918 A1 | 4/1994 |
| WO | 2000073955 * | 5/2000 |

OTHER PUBLICATIONS

Matthee, Towards the Two-Way Symmetrical Communication Model: The Use Of Social Media To Create Dialogue Around Brands. Magister Atrium in Applied Media Studies in the Faculty of Arts at the Nelson Mandela Metropolitan University. (Year: 2011).*

(Continued)

*Primary Examiner* — Patricia H Munson
*Assistant Examiner* — Uche Byrd
(74) *Attorney, Agent, or Firm* — Perkins Coie LLP; Michael Glenn; Colin Fowler

(57) ABSTRACT

Improvement of customer experiences during online commerce is accomplished by providing unique experiences to customers as a result of anticipating customer needs, simplifying customer engagement based on predicted customer intent, and updating system knowledge about customers with information gathered from new customer interactions. In this way, the customer experience is improved.

15 Claims, 10 Drawing Sheets

(56) References Cited

U.S. PATENT DOCUMENTS

| | | | |
|---|---|---|---|
| 8,533,208 B2 | 9/2013 | Sundaresan et al. | |
| 9,021,361 B1* | 4/2015 | Pettinati | G06Q 30/00 715/736 |
| 2002/0062368 A1 | 5/2002 | Holtzman et al. | |
| 2004/0236832 A1 | 11/2004 | Morris et al. | |
| 2006/0212811 A1* | 9/2006 | Gottfurcht | G06F 3/04892 715/201 |
| 2006/0242140 A1 | 10/2006 | Wnek | |
| 2008/0065471 A1 | 3/2008 | Reynolds et al. | |
| 2008/0077572 A1 | 3/2008 | Boyle et al. | |
| 2008/0167952 A1 | 7/2008 | Blair et al. | |
| 2008/0189380 A1 | 8/2008 | Bosworth et al. | |
| 2008/0249764 A1 | 10/2008 | Huang et al. | |
| 2009/0012826 A1 | 1/2009 | Eilam et al. | |
| 2009/0119281 A1 | 5/2009 | Wang et al. | |
| 2009/0222313 A1 | 9/2009 | Kannan et al. | |
| 2009/0228264 A1 | 9/2009 | Williams et al. | |
| 2009/0249279 A1 | 10/2009 | Bourdon | |
| 2010/0002863 A1 | 1/2010 | Loftus et al. | |
| 2010/0005268 A1 | 1/2010 | Xiao et al. | |
| 2010/0049679 A1* | 2/2010 | Phillips | G06N 99/005 706/15 |
| 2010/0104087 A1 | 4/2010 | Byrd et al. | |
| 2010/0119053 A1 | 5/2010 | Goeld | |
| 2010/0138282 A1* | 6/2010 | Kannan | G06Q 30/02 705/7.42 |
| 2010/0191658 A1 | 7/2010 | Kannan et al. | |
| 2010/0257117 A1 | 10/2010 | Shvadron et al. | |
| 2010/0275128 A1 | 10/2010 | Ward et al. | |
| 2010/0325107 A1 | 12/2010 | Kenton et al. | |
| 2010/0332287 A1 | 12/2010 | Gates et al. | |
| 2011/0276513 A1 | 11/2011 | Erhart et al. | |
| 2012/0076283 A1 | 3/2012 | Ajmera et al. | |
| 2012/0095770 A1 | 4/2012 | Jacob Sushil et al. | |
| 2012/0130771 A1 | 5/2012 | Kannan et al. | |
| 2012/0259919 A1 | 10/2012 | Yan et al. | |
| 2013/0166457 A1 | 6/2013 | Du et al. | |
| 2014/0181699 A1* | 6/2014 | Godsey | G06F 3/0481 715/760 |

OTHER PUBLICATIONS

Bar-Hillel, et al., "Learning a Mahalanobis Metric from Equivalence Constraints", Journal of Machine Learning Research, Apr. 2005, pp. 1-29.

Basu, et al., "A Probabilistic Framework for Semi-Supervised Clustering", Proc. of the Tenth ACM SIGKDD Int'l Conference on Knowledge Discovery and Data Mining, Seattle, WA, Aug. 2004, pp. 59-68.

Basu, et al., "Active Semi-Supervision for Pairwise Constrained Clustering", Proc. of the SIAM Int'l Conference on Data Mining, Lake Buena Vista, FL, Apr. 2004, pp. 333-344.

Basu, et al., "Semi-supervised Clustering by Seeding", Proc. of the 19th Int'l Conference on Machine Learning, Sydney, Australia, Jul. 2002, pp. 19-26.

Bilenko, et al., "Integrating Constraints and Metric Learning in Semi-Supervised Clustering", Proc. of the 21st Int'l Conference on Machine Learning, Banff, Canada, Jul. 2004, pp. 81-88.

Chuang, et al., "Emotion Recognition From Textual Input Using an Emotional Semantic Network", ICSLP 2002, Denver, Sep. 2002, pp. 2033-2036.

Chuang, et al., "Enriching Web Taxonomies through Subject Categorization of Query Terms from Search Engine Logs", Decision Support Systems, vol. 35, No. 1, Apr. 2003, 18 pages.

Cover, T.M. , "Nearest Neighbor Pattern Classification", IEEE Transactions on Information Theory, vol. IT-13, No. 1, Jan. 1997, pp. 21-27.

Cowie, et al., "Describing the emotional states that are expressed in speech", Speech Communication Special Issue on Speech and Emotion, Jun. 2002, 28 pages.

Cutting, et al., "Scatter/Gather: A Cluster-based Approach to Browsing Large Document Collections", ACM 15th Annual Int'l SIGIR '92, Jun. 1992, 12 pages.

Domingos, et al., "On the Optimality of the Simple Bayesian Classifier under Zero-One Loss", Kluwer Academic Publishers, Boston., Nov. 1997, 30 pages.

Friedman, N. et al., "Bayesian Network Classifiers", Machine Learning, vol. 29, Nov. 1997, pp. 131-163.

Griffin, et al., "The Voice of the Customer", Marketing Science, vol. 12, No. 1, Winter 1993, 27 pages.

Haichao, et al., "Structural Analysis of Chat Messages for Topic Detection", Online Information Review, vol. 30, No. 5, Sep. 2006, 33 pages.

Jain, et al., "Data Clustering: A Review", ACM Computing Surveys, Sep. 1999, pp. 264-323.

Johnson, S.C. , "Hierarchical Clustering Schemes", Psychometrika, vol. 32, No. 3, Sep. 1967, pp. 2741-254.

Kose, et al., "A Comparison of Textual Data Mining Methods for Sex Identification in Chat Conversations", LNCS 4993, Jan. 2008, pp. 938-643.

Langley, et al., "An Analysis of Bayesian Classifiers", Proceedings of the Tenth National Conference on Artificial Intelligence, Jul. 1992, pp. 223-228.

Liu, et al., "A Model of Textual Affect Sensing using Real-World Knowledge", ACM IUI '03, Miami, Florida, USA, Jan. 2003, 8 pages.

McQueen, , "Some methods for classification and analysis of multivariate observations", Proc. of Symposium on Mathematics, Statistics & Probability held Jun. 21-Jul. 18, 1965 and Dec. 27, 1965-Jan. 7, 1966, Berkeley, California, 1967, pp. 281-298.

Mehta, et al., "SLIQ: A Fast Scalable Classifier for Data Mining", Int'l Conference on Extending Database Technology, Mar. 1996, 15 pages.

Quinlan, J.R. , "Induction of Decision Trees", Machine Learning 1, 1986, pp. 81-106.

Ruiz, et al., "Hierarchical Text Categorization Using Neural Networks", Kluwer Academic Publishers, Jan. 2002, 40 pages.

Sebastiani, F. , "Machine Learning in Automated Text Categorization", ACM Computing Surveys, vol. 34, No. 1, Mar. 2002, pp. 1-47.

Steinbach, et al., "A Comparison of Document Clustering Techniques", In KDD Workshop on Text Mining, Boston, MA, Aug. 2000, 20 pages.

Tang, et al., "Bias Analysis in Text Classification for Highly Skewed Data", Fifth IEEE Int'l Conference on Data Mining, Nov. 2005, 8 pages.

Wagstaff, et al., "Constrained K-means Clustering with Background Knowledge", In Proceedings of the 18th Int'l Conference on Machine Learning, Jun. 2001, 8 pages.

Wetzker, et al., "Tailoring Taxonomies for Effieicent Text Categorization and Expert Finding", IEEE/WIC/ACM Int'l Conference on Web Intelligence and Intelligent Agent Technology, vol. 3, Dec. 2008, pp. 459-462.

Wong, et al., "Incremental Document Clustering for Web Page Classification", IEEE Int'l Conference on Information Society in the 21st Century: Emerging Technologies and New Challenges, Japan, Jul. 1, 2000, 21 pages.

Xiang, et al., "Learning a Mahalanobis distance metric for data clustering and classification", Pattern Recognition, vol. 41, Dec. 2008, pp. 3600-3612.

Xing, et al., "Distance metric learning, with application to clustering with side-information", Advances in Neural Information Processing Systems, vol. 15, Dec. 2003, pp. 505-512.

Yang, et al., "A re-examination of text categorization methods", Proceedings of the 22nd Annual Int'l ACM SIGIR Conference on Research and Development in Information Retrieval, Berkeley, CA, USA, Aug. 1999, pp. 42-49.

Zamir, et al., "Fast and Intuitive Clustering of Web Documents", American Association for Artificial Intelligence, KDD-97 Proceedings, Newport Beach, CA, Aug. 1997, pp. 287-290.

(56) References Cited

OTHER PUBLICATIONS

Zhang, H., "Exploring Conditions for the Optimality of Naive Bayes", Int'l Journal of Pattern Recognition and Artificial Intelligence, vol. 19, No. 2, World Scientific Publishing Co., Mar. 2005, pp. 183-198.
Zhao, et al., "Empirical and Theoretical Comparisons of Selected Criterion Functions for Document Clustering", Machine Learning, Kluwer Academic Publishers, Jun. 2004, pp. 311-331.
Zhao, et al., "Hierarchical Clustering Algorithms for Document Datasets", Data Mining and Knowledge Discovery, vol. 10, Mar. 2005, pp. 141-168.
Vijayasarathy, "Predicting consumer intentions to user online shopping: the case for an augmented technology acceptance model", 2003.

\* cited by examiner

METHOD AND APPARATUS FOR AN INTUITIVE CUSTOMER EXPERIENCE

CROSS REFERENCE TO RELATED APPLICATIONS

This application claims priority to U.S. provisional patent application Ser. No. 61/636,275, filed Apr. 20, 2012, which application is incorporated herein in its entirety by this reference thereto.

BACKGROUND

Technical Field

The invention relates to improving customer experiences during online commerce. More particularly, the invention relates to predictive analytics based systems and methods that improve customer experiences during online commerce.

Description of the Background Art

The rapid adoption of the Internet and other communication technologies over the last decade or so has changed the way people buy products and services. While e-commerce is convenient for buyers and sellers alike, there are certain challenges faced by businesses if they are to serve their prospective customers effectively.

It is the endeavor of every business to serve its customers in the best way possible by providing a truly unique and satisfying experience. Providing such an experience to every customer is only possible if the business customizes or personalizes its services according to the customer's needs. To be able do that, businesses must understand the customers, their needs, their intents, and so on to be able to offer the right experience to the customer.

In traditional commerce, it is more or less easy to identify customers, their intentions, and related characteristics based on their behavior due to the personal nature, which may be face-to-face, voice-based, and so on, of the interactions with the customers. In the case of e-commerce, for example online stores, it is not trivial to identify customers and recommend products or services to them. In a traditional brick and mortar store, it is possible to identify if a prospective customer is a young person or an elderly person by looking at the customer, if a prospective customer is looking to buy a product and/or service, or if the customer is just window shopping by the way he is talking, and so on. The same cannot be done for a prospective customer in an online store.

SUMMARY

Improvement of customer experiences during online commerce is accomplished by providing unique experiences to customers by anticipating customer needs, simplifying customer engagement based on predicted customer intent, and updating system knowledge about customers with information gathered from new interactions. In this way, the customer experience is improved.

DETAILED DESCRIPTION

Figure 1:
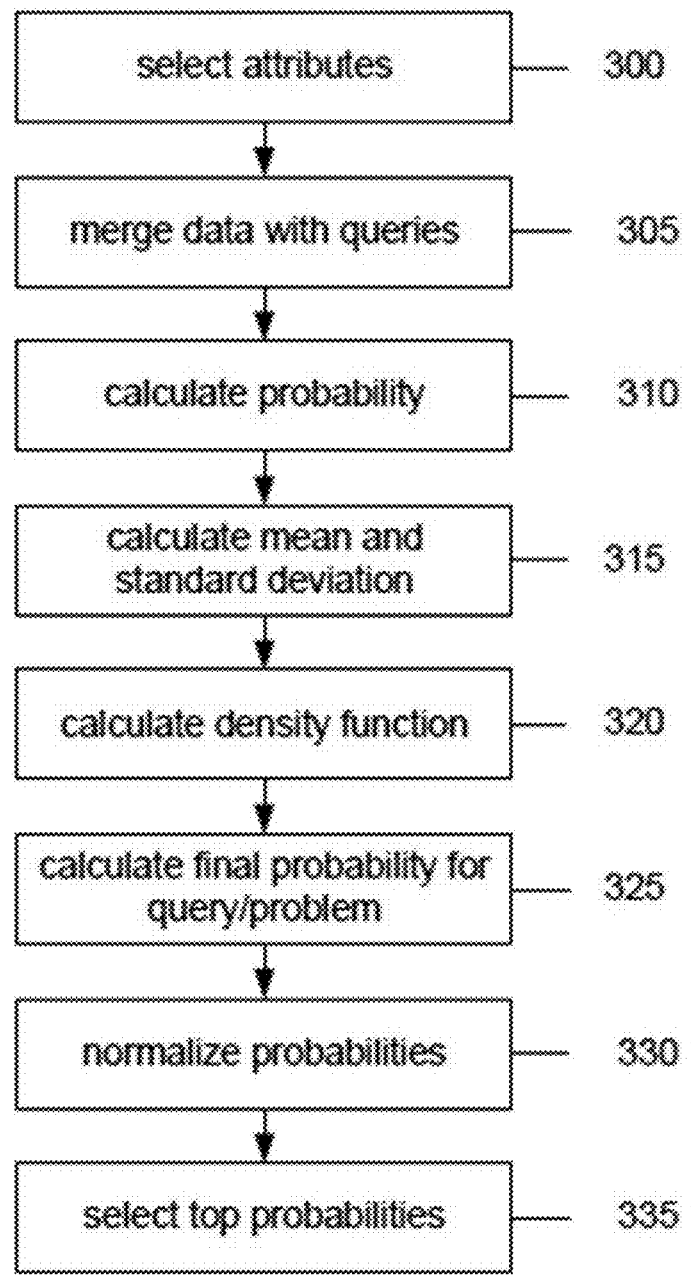
FIG. 1 is a flow chart that illustrates the steps for predicting behavior according to one embodiment of the invention.

Improvement of customer experiences during online commerce is accomplished by providing unique experiences to customers by anticipating customer needs, simplifying customer engagement based on predicted customer intent, and improving system knowledge about customers with information gathered from new interactions through machine learning at scale. In this way, the customer experience is improved.

The embodiments herein disclose methods and systems for predictive analytics and machine learning to improve customer experiences in online commerce. Improvement of customer experiences is provided through unique and satisfying experiences to customers by anticipating customer needs through prediction of customer intent, simplifying customer engagement based on the predicted customer intent, and updating system knowledge and the machine learning models about a customer with information on new interactions. In this way, it is possible to serve customers better.

The embodiments herein disclose a framework to transform the customer experience in customer service and/or customer care scenarios. The framework leverages big data analytics, i.e. analytics that are applied to a collection of data sets so large and complex that it becomes difficult to process using on-hand database management tools or traditional data processing applications, to:

Anticipate customer needs through sophisticated predictive analytics that predict the intent of the customer when the customer interacts with a customer service system, e.g. machine and/or human.

In embodiments of the invention, the intent model manifests itself in various forms, including but not limited to:
  Propensity to purchase, propensity for cross-sell, propensity for up-sell, etc. models in the case of a sales or customer acquisition scenario; and
  Current customer issue prediction, next customer issue prediction, etc. in the case of an after sale, support scenario.

Embodiments of the invention incorporate a database which stores past customer interaction data, product information including issues, service requests etc. Embodiments of the invention may also incorporate a data engine for data processing because the data received from the different sources is frequently received in different formats, e.g. comma separated values (csv), tab delimited text files, etc. In some cases, the data warehouse stores data in columns. The customer interaction data engine transforms the data into a proper format for storage in the data warehouse. This transformation also includes taking unstructured data, such as the text of a chat, and structuring it into the proper format. In one embodiment, the customer interaction data engine receives data from the database via a file transfer protocol (FTP) from the websites of companies that provide goods and services.

The data warehouse may be frequently updated with data. As a result, the data is increasingly accurate. This is particularly important when a model is generated for a customer using that customer's previous interactions with a company because those interactions are a strong predictor of future behavior.

Embodiments of the invention also incorporate a predictive engine which compiles the data from the data warehouse and organizes the data into clusters known as contributing variables. Contributing variables are variables that have a statistically significant effect on the data. For example, the shipment date of a product affects the date that the customer reports a problem. Problems tend to arise after certain periods, such as immediately after the customer receives the product, or a year after use. Thus, the shipment date is a contributing variable. Conversely, in the present example product identification is not a contributing variable because it cannot be correlated with any other factor.

Contributing variables are calculated according to whether the variable is a numerical or a categorical prediction. Contributing variables for numbers are calculated using regression analysis algorithms, e.g. least squares, linear regression, a linear probability model, nonlinear regression, Bayesian linear regression, nonparametric regression, etc. Categorical predictions use different methods, for example a Naive Bayes algorithm or other machine learning and artificial intelligence techniques, such as support vector machines, artificial neural networks, and agent based models.

The contributing variables are used to generate models that predict trends, patterns, and exceptions in data through statistical analysis. In one embodiment, the predictive engine may use a naive Bayes algorithm to predict behavior. For example, a naive Bayes algorithm is used by the predictive engine to predict the most common problems associated with a family in Arizona using mobile devices made by Company A. FIG. 1 is a flow chart that illustrates the steps for predicting behavior according to one embodiment of the invention. In FIG. 1, the steps performed by the predictive engine 130 generate a model that predicts behavior and/or problems.

The problem to be solved by the predictive engine 130 is given a set of customer attributes, what are the top queries the customer is likely to have. Attributes are selected 300 for the model and for different levels of the attribute. Table 1 illustrates the different attributes: state, plan, handset, BznsAge, and days left on the plan. BznsAge is an abbreviation of business age, i.e. how long someone has been a customer. The attribute levels further categorize the different attributes.

TABLE 1

| Attributes | Attribute Levels | | | |
|---|---|---|---|---|
| State | Arizona | Alabama | Wisconsin | Ohio |
| Plan | Family | Basic | Friends | |
| Handset | ACo | BCo | CCo | |
| BznsAge | Continuous Numeric Values | | | |
| Days_Left | Continuous Numeric Values | | | |

Data from the problem dimension 100, product dimension 105, and agent dimension 110 are merged 305 with queries from text mining. These text mining queries are examples of unstructured data that was structured by the customer interaction data engine 117. Table 2 shows the merged data for the customer attributes. Table 3 shows the merged data for the queries from text mining, which include all the problems associated with the mobile phones.

TABLE 2

| | Customer's Attributes | | | | |
|---|---|---|---|---|---|
| ID | State | Plan | Handset | BznsAge | Days_Left |
| 1 | Arizona | Friends | ACo | 245 | 123 |
| 2 | Alabama | Basic | ACo | 324 | 234 |
| 3 | Alabama | Basic | BCo | 254 | 245 |
| 4 | Wisconsin | Friends | CCo | 375 | 311 |
| 5 | Arizona | Family | ACo | 134 | 153 |
| 6 | Alabama | Basic | BCo | 234 | 134 |
| 7 | Ohio | Friends | ACo | 296 | 217 |
| 8 | Ohio | Friends | BCo | 311 | 301 |
| 9 | Ohio | Basic | CCo | 186 | 212 |
| 10 | Arizona | Family | ACo | 276 | 129 |
| 11 | Wisconsin | Friends | BCo | 309 | 187 |
| 12 | Arizona | Basic | BCo | 244 | 156 |
| 13 | Alabama | Family | CCo | 111 | 256 |
| 14 | Arizona | Friends | CCo | 222 | 385 |
| 15 | Ohio | Family | ACo | 268 | 134 |

TABLE 3

| | Queries from Text Mining | | | | | | | | |
|---|---|---|---|---|---|---|---|---|---|
| | Signal | Battery | Screen | Access | CallDrop | Warranty | Accessories | Activation | Cancel |
| ID | 0 | 1 | 1 | 1 | 0 | 1 | 0 | 1 | 0 |
| 1 | 0 | 1 | 0 | 1 | 1 | 0 | 0 | 1 | 1 |
| 2 | 0 | 1 | 0 | 0 | 1 | 1 | 0 | 1 | 1 |
| 3 | 1 | 1 | 0 | 1 | 0 | 1 | 1 | 0 | 1 |
| 4 | 0 | 0 | 0 | 1 | 1 | 1 | 1 | 0 | 1 |
| 5 | 1 | 1 | 0 | 1 | 1 | 1 | 0 | 1 | 1 |
| 6 | 1 | 1 | 1 | 0 | 1 | 0 | 1 | 1 | 0 |
| 7 | 1 | 1 | 0 | 0 | 1 | 0 | 1 | 1 | 1 |
| 8 | 1 | 1 | 0 | 1 | 1 | 0 | 0 | 0 | 0 |
| 9 | 1 | 0 | 1 | 1 | 0 | 1 | 0 | 1 | 1 |
| 10 | 1 | 0 | 1 | 1 | 1 | 1 | 0 | 0 | 0 |
| 11 | 0 | 0 | 0 | 0 | 0 | 1 | 1 | 0 | 1 |
| 12 | 0 | 1 | 0 | 1 | 1 | 1 | 1 | 0 | 1 |

TABLE 3-continued

Queries from Text Mining

| | Signal | Battery | Screen | Access | CallDrop | Warranty | Accessories | Activation | Cancel |
|---|---|---|---|---|---|---|---|---|---|
| 13 | 0 | 1 | 0 | 0 | 0 | 1 | 0 | 1 | 1 |
| 14 | 0 | 0 | 0 | 1 | 0 | 0 | 1 | 1 | 0 |
| 15 | 7 | 10 | 5 | 10 | 9 | 10 | 7 | 9 | 10 |
| Grand Total | | | | | | 77 | | | |

Where a 1 represents a problem and a 0 represents no problem.

The conditional probability of Query Q to be asked by the customer if he possesses the attributes $A_1, \ldots, A_n$ is determined by calculating 310 the probability p(Q) and calculate 315 the conditional probabilities $p(A_i/Q)$ using the naïve Bayes algorithm:

$$p(Q/A_1, \ldots, A_n) = p(Q)p(A_1/Q)p(A_2/Q) \ldots p(A_n/Q) \qquad \text{Eq. (1)}$$

p(Q) is calculated as the ration of number times query Q that appears in the matrix to the summation of number of times all the queries $Q_1, \ldots Q_n$ occur. $p(A_i/Q)$ is calculated differently for categorical and continuous data. The probabilities for all Queries based on the attributes are calculated and the top three problems are selected based on the value of probability.

For example, if a customer comes with the attributes (Arizona, Family, Nokia, 230, 120), the probability of Signal query can be calculated as follows:

$$p(\text{Signal/Arizona,Family,ACo,230,120}) = p(\text{Signal})p(\text{Arizona/Signal})p(\text{Family/Signal})p(\text{BznsAge=230/Signal})p(\text{DaysLeft=120/Signal})$$

$p(A_i/Q)$ can be calculated as the ratio of the number of times attribute $A_i$ appeared in all the cases when Query Q appeared to the number of times Query Q appeared.

The probabilities for Signal Query are:

p(Signal)=7/77 Signal query appears seven times while there are a total of 77 Queries(Tables 2 and 3). p(Arizona/Signal)=1/7 Arizona appears only once when Signal query occurs. p(Family/Signal)=1/7 Family appears only once when Signal query occurs. p(ACo/Signal)=2/7 SACo appears only once when Signal query occurs.

The Cancel Query is calculated the same way:

p(Cancel)=10/77. p(Arizona/Cancel)=4/10. p(Family/Cancel)=3/10. p(ACo/Cancel)=3/10.

These conditional probabilities can be populated in a matrix, to be used in a final probability calculation. The cells with an * do not have a calculated probability, however, in an actual calculation these cells would have to be populated as well. Table 4 is a matrix populated with the conditional probabilities.

Assuming the data to be normally distributed, the probability density function is:

$$f(x) = (1/2\pi\sqrt{\sigma})e^{-[(x-\mu)^2/2\sigma^2]} \qquad \text{Eq. (2)}$$

Probability at a single point in any continuous distribution is zero. Probability for a small range of a continuous function is calculated as follows:

$$P(x-\Delta x/2 < X < x+\Delta x/2) = \Delta x \, f(x) \qquad \text{Eq. (3)}$$

Treating this as the probability for a particular value, we can neglect $\Delta x$ because this term appears in all the probabilities calculated for each Query/Problem. Hence the density function $f(x)$ is used as the probability, which is calculated 325 for a particular numeric value X from its formula. The mean ($\mu$) and standard deviation ($\sigma$) for the assumed normal distribution can be calculated 320 as per the following formulas:

$$\mu = 1/n(\Sigma_{i=1}^{n} X_i) \qquad \text{Eq. (4)}$$

$$\sigma = \sqrt{[1/n-1(\Sigma_{i=1}^{n}(X_i-\mu)^2]} \qquad \text{Eq. (5)}$$

For signal problem, the mean and standard deviation for BznsAge are calculated using equations 4 and 5:

$$\mu_{BznsAge} = (375+234+296+311+186+276+309)/7 = 283.85$$

$$\sigma_{BznsAge} = 1/6[(375-283.85)^2+(234-283.85)^2+(296-283.85)^2+(311-283.85)^2+(186-283.85)^2+(276-283.85)^2+(309-283.85)^2] = 60.47$$

$$p(\text{BznsAge=230/Signal}) = [1/(2\pi\sqrt{60.47})]e^{\wedge}(230-283.85)^2/60.47^2 = 0.029169$$

Similarly for Days_Left: $\mu_{DaysLeft}=213$, $\sigma_{DaysLeft}=72.27, p(\text{DaysLeft=120/Signal})=0.04289$ For Cancel, the mean and standard deviation are for BznsAge and Days_Left are calculated in similar fashion:

TABLE 4

| | Signal | Battery | Screen | Access | CallDrop | Warranty | Accessories | Activation | Cancel |
|---|---|---|---|---|---|---|---|---|---|
| p(Query) | 7/77 | * | * | * | * | * | * | * | 10/77 |
| p(Attribute/Query) | | | | | | | | | |
| Arizona | 1/7 | * | * | * | * | * | * | * | 4/10 |
| Alabama | * | * | * | * | * | * | * | * | * |
| Wisconsin | * | * | * | * | * | * | * | * | * |
| Ohio | * | * | * | * | * | * | * | * | * |
| Family | 1/7 | * | * | * | * | * | * | * | 3/10 |
| Basic | * | * | * | * | * | * | * | * | * |
| Friends | * | * | * | * | * | * | * | * | * |
| ACo | 2/7 | * | * | * | * | * | * | * | 3/10 |
| BCo | * | * | * | * | * | * | * | * | * |
| CCo | * | * | * | * | * | * | * | * | * |

$\mu_{BznsAge}$=248.5, $\sigma_{BznAge}$=81.2, p(BznsAge=230/Cancel)= 0.018136, $\mu_{DaysLeft}$=230.4, $\sigma_{DaysLeft}$=86.51, p(Days-Left=120/Cancel)=0.03867.

These probabilities are calculated in real time, with the exact value of the attribute possessed by the customer. Table 5 is a matrix populated with the mean and standard deviations, which are further used for the probability calculation in real time.

TABLE 5

|  |  | Signal | Cancel |
|---|---|---|---|
| BznsAge | Mean ($\mu$) | 283.85 | 248.5 |
|  | S.D ($\sigma$) | 60.47 | 81.2 |
| Days_Left | Mean ($\mu$) | 213 | 230.4 |
|  | S.D ($\sigma$) | 72.27 | 86.51 |

The final probability for a query/problem for the given set of attributes is calculated 330:

$p$(Signal/Arizona,Family,ACo,230,120)=7/77*1/7*1/ 7*2/7*0.029169*0.04289=0.0000006632

$p$(Cancel/Arizona,Family,ACo,230,120)=10/77*4/ 10*3/10*3/ 10*0.018136*0.03867=0.0000032789

The probabilities are normalized 335 and the top three probabilities and corresponding queries/problems are selected 340.

Normalization:

$p$(Signal/Arizona,Family,ACo,230,120)= (0.0000006632/0.0000006632+0.0000032789)* 100=83.17%

$p$(Cancel/Arizona,Family,ACo,230,120)= (0.0000032789/0.0000032789+0.0000006632)* 100=16.83%

Thus, in this example, the signal problem has a significantly higher probability of occurring as compared to the cancel problem.

If any conditional probability for an attribute is zero, the zero cannot be used in calculations because any product using zero is also zero. In this situation, the Laplace estimator is used:

$$p(A_i/Q)=(x+1/y+n) \qquad \text{Eq. (6)}$$

Where 1/n is the prior probability of any query/problem. If the x and y were not present in the equation, the probability would be 1/n. In this equation, even if x is 0, the conditional probability is nonzero.

Models

This aspect of the invention requires sorting the data in order of magnitude, moving between high-level organization, e.g. general trends to low-level views of data, i.e. the details. In addition, it is possible to drill up and down through levels in hierarchically structured data and change the view of the data, e.g. switch the view from a bar graph to a pie graph, view the graph from a different perspective, etc.

In one embodiment, the models represent data with text tables, aligned bars, stacked bars, discrete lines, scatter plots, Gantt charts, heat maps, side-by-side bars, measure bars, circles, scatter matrices, histograms, etc.

Generating Models

The predictive engine determines contributing variables by calculating probabilities. As described in the example, one method of determining contributing variables is by using the naive Bayes algorithm. This is just an example and a person of ordinary skill in the art will recognize how to determine contributing variables using other statistical algorithms.

Figure 2:
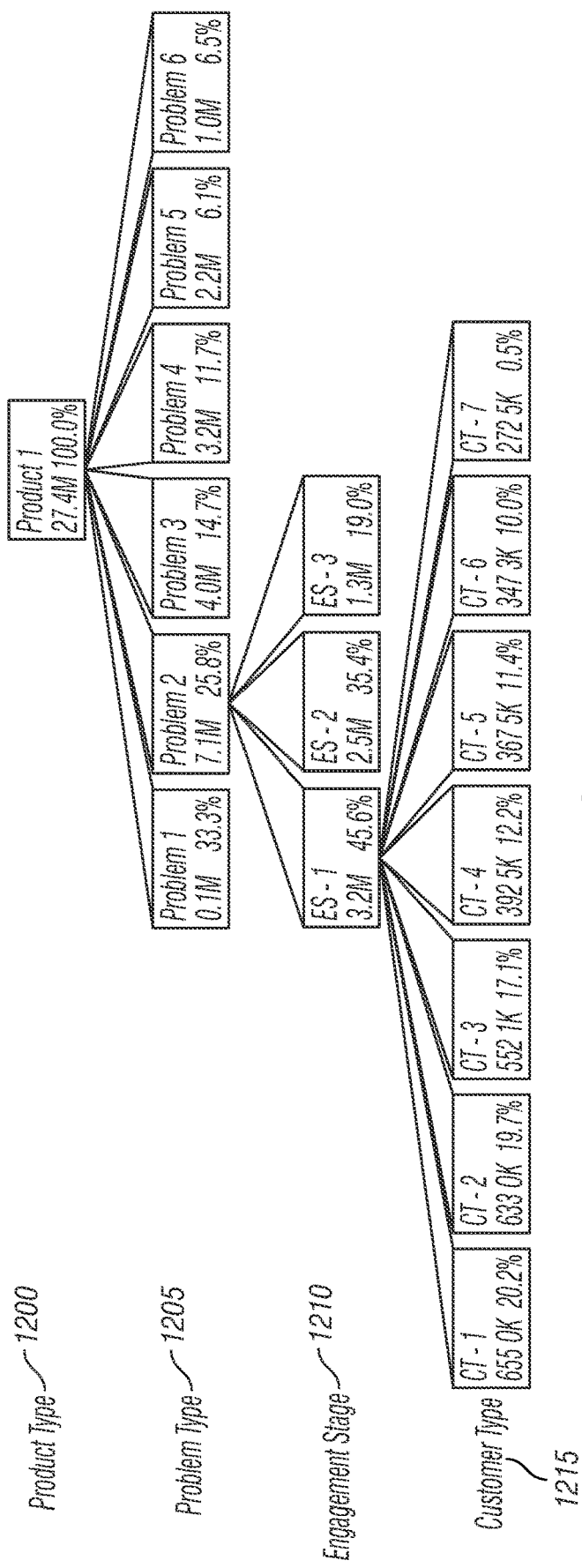
FIG. 2 is a model for predicting the probability of a customer to face a particular problem according to one embodiment of the invention.

Models can also be built to predict future actions. FIG. 2 is an example where a user selects a product type 1200. The model displays the different problems 1205 associated with that product 1200. The user specifies the engagement stage 1210. The model displays the likelihood that a certain type of customer 1215 at that engagement stage 1210 will have a problem. Customer types are organized according to multiple variables. For example, a problem customer is a customer that reports issues associated with products frequently, returns products, takes over ten minutes to speak with an agent during calls, etc.

Once the predictive engine is ready to build models, the user selects the data sources which are used to build models. By experimenting with different variables in the models, the predictive engine tests and validates different models. Based on these models, the predictive engine identifies key contributing variables and builds interaction methodologies to influence the outputs. As more data is received by the data warehouse, these steps are repeated to further refine the model.

In a further embodiment the predictive engine may receive a request in real time to generate a predictive model. The predictive engine builds a model using the data received by the user. For example, the predictive engine may receive an identifying characteristic of a customer, e.g. unique ID, telephone number, name, etc. and be asked to predict the best mode of communicating with this customer, the most likely reason that the customer is calling, etc.

Figure 3:
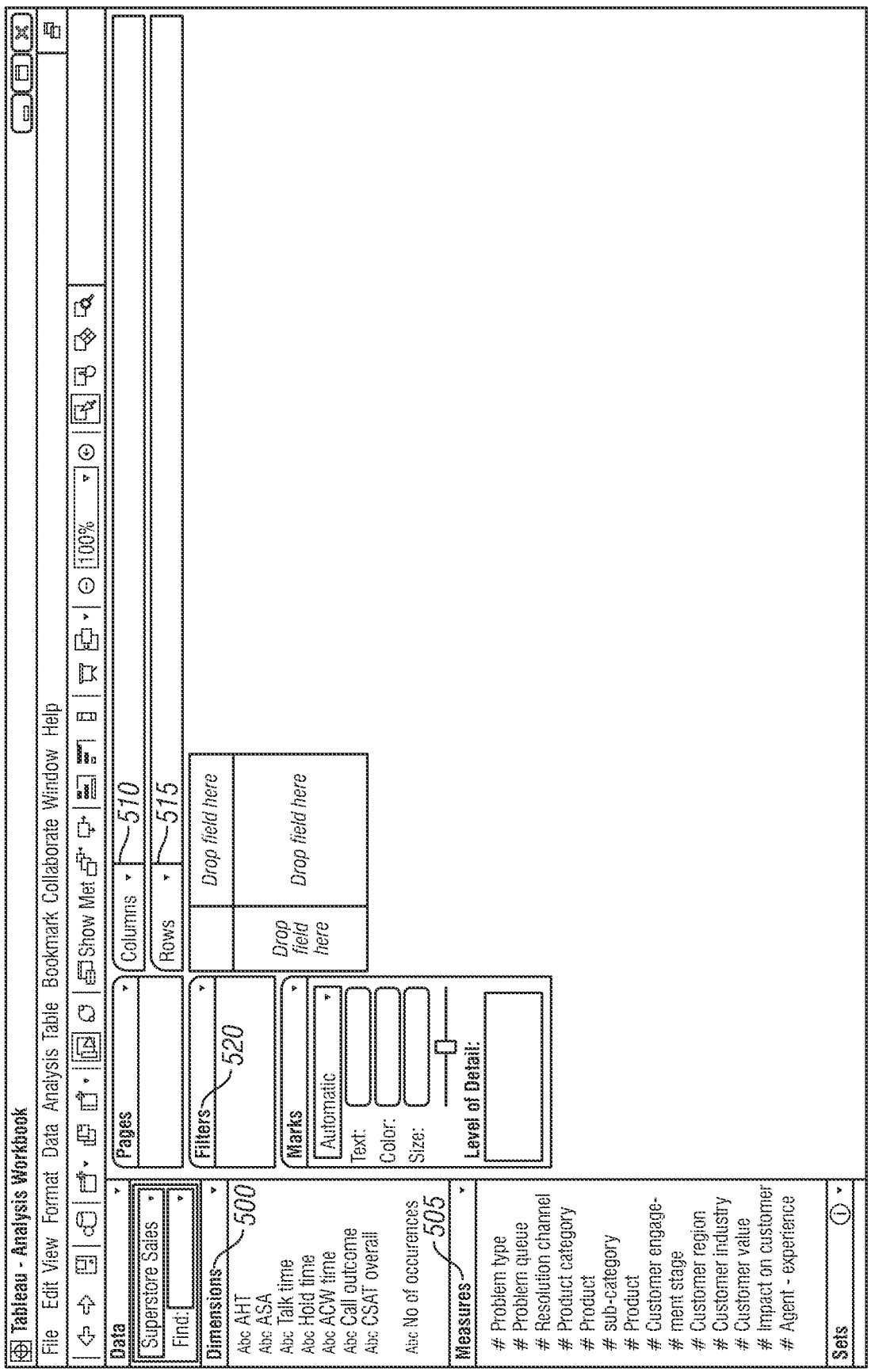
FIG. 3 is a user interface for generating a model according to one embodiment of the invention.
Figure 5:
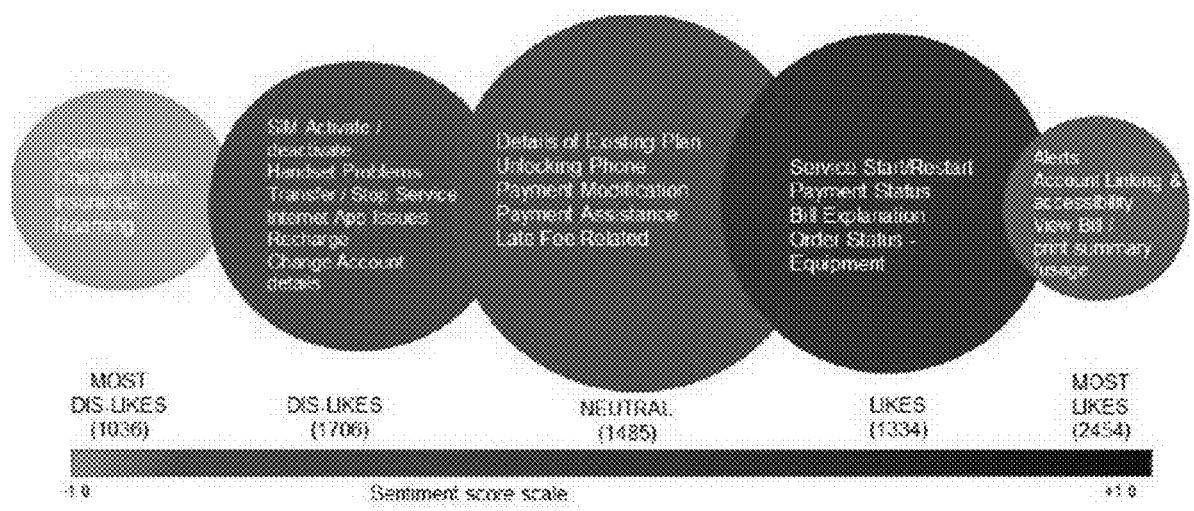
FIG. 5 is a graphic illustration that shows topic-level sentiment capturing in Twitter along a sentiment score scale.

In another embodiment, the predictive engine receives a request for a model depicting various attributes as selected by the user from a user interface such as that illustrated in FIG. 3 according to one embodiment of the invention. The data sources are divided according to dimensions and measures. Dimension refers to attributes of an entity for analysis, for example, customer interaction as a product of geography. Measures refer to variables that can be measured. For example, number of products purchased, number of issues associated with a product, etc. In FIG. 5, the available dimensions are AHT, ASA, talk time, hold time, ACW time, call outcome, CSAT overall, and number of occurrences. The available measures are problem type, problem queue, resolution channel, product category, product sub-category, product, customer engagement stage, customer region, customer industry, customer value, impact on customer, and agent-experience. The user specifies which variable is displayed in columns and rows. In one embodiment, the user specifies a filter to filter certain variables from being considered by the model.

Simplify the experience once the customer's intent is known based on the intent predictions as explained above.

The predictive engine predicts information, such as the probability of a customer to face a particular problem, based on the customer's engagement stage with a particular problem. An engagement stage is product specific. For example the engagement stage can be measured by time, e.g. the first stage is 0-15 days after purchase, the second stage is 15 days-two months after purchase, etc. In addition, the model predicts a customer's preference of a particular channel based on the type of concern and its impact on customer experience. Lastly, the models predict the probable impact of a particular problem on the customer's loyalty, growth, and profitability score.

Once the model is generated, a business can use the system to predict how to best serve their clients, e.g. whether to staff more customer service representatives or invest in developing a sophisticated user interface for receiving orders. In another embodiment, the model is used in real-time to predict customer behavior. For example, a customer calls a company and, based on the customer's telephone number, the customer ID is retrieved and the company predicts a user interaction mode. If the user interaction mode is a telephone conversation with an agent, the model assigns an agent to the customer.

In another example, the model is incorporated into a website. A customer visits the website and requests interaction. The website prompts the user for information, for example, the user name and product. The model associates the customer with that customer's personal data or the model associates the customer with a cluster of other customers with similar shopping patterns, regional location, etc. The model predicts a user interaction mode based on the answers. For example, if the system predicts that the customer is best served by communicating over the phone with an agent, the program provides the user with a phone number of an agent.

In a service case scenario the services are categorized as booking, providing a quote, tracking a package, inquiries on supplies, and general inquiries. The model prediction is applied to customer categories according to these services. For example, a model predicts a customer's preference for a particular channel when the customer wants a quote for a particular good or service.

In this embodiment, the focus is to leverage predicted knowledge of the customer's intent to provide the best customer experience although it's not a defined term, customer experience is usually measured through a customer experience design framework that leverages several tools and pieces of information, including but not limited to:

Predicted intent based on history and current journey. This refers to intent prediction based on past customer data, as explained earlier, for example based on the past customer interaction data or using the real-time available information about the customer and using appropriate models which can predict intent based on said real-time data;

Customer interface and experience design. This aspect of the invention concerns designing and enhancing the engagement or UI based on predicted information. For example, based on past customer records, when a business can predict that when a particular customer books a flight, the customer is likely to look for excess baggage allowance section on the website. Once the business has this insight at hand, using the present system the customer can be directed directly to said information by way of variety of means including popping up a link or providing a chat etc.; and A design of experiment (DoE) framework that performs statistical experiments.

Experimentation Framework

An interaction system can be composed of several building blocks which together serve a common purpose, i.e. interact with the end user in the best possible manner. These building blocks can be: "Rules" or "models" which trigger a new interaction flow or an action within the interaction. The channel of the interaction, for example Web, phone, self service, chat, voice, etc. The experience within a given channel. The seamless handling of an interaction across various channels.

To optimize these building blocks to achieve the best business outcomes, one needs to experiment with these building blocks and determine which configuration of these building blocks produces the optimum results in a real world environment. The optimization can be on any parameter or set of parameters, based on the business needs.

Here are a few example use cases:

1. The ability to evaluate different set of rules or models for different samples of visitors in real time. This experimentation can help figure out which set of rules performs the best.
2. The ability to take different actions whenever a rule or model triggers for different samples of visitors in real time. This experimentation can help figure out which action performs the best.
3. The ability to have different working, content, and look and feel of an action for different samples of visitors in real time. This again, can help figure out which content, working, and/or look and feel leads to best results to identify quickly a customer design that works well.

Learns at scale from each and every interaction.

Once the system is deployed the databases is constantly updated in real-time and data for all the customer interactions, including Web journeys, chats, feedbacks, IVR, and voice channels. Thus, once the system is deployed and customer engages with the system the data is captured. Based on this new data, the system learns that is to adjust the prediction, as well customer interface and design elements, e.g. based on the data, if the system learns that earlier customer design suggested chat as a preferred mode of interaction, and based on new data customer prefers voice, then the system updates the design for the customer or class of customers, as the case may be, using various machine learning and statistical techniques. In this embodiment, both the analysis that Anticipates the customer's needs and the changes that are necessary to Simplify the customer experience are updated based on the current interactions. Learning may be based on models, including but not limited to:

The models used here are described earlier in the Anticipate section for intent prediction. As new interactions occur, these models are updated based on the data generated by the new interaction. This learning automatically updates the Anticipate or intent prediction models to incorporate the new interaction into the models.

Text mining based issue categorization. The system can use various machine learning techniques and algorithms including un-supervised, semi-supervised, or supervised. For example in one approach, to categorize the different kinds of issues in a session, initially a category tree is built. Once a category tree is built, the categories are defined and the rules are created, which may include rules in the language model such as noun count, word count, and so on. Further, a matrix is generated a based on scoring and the matrix is given a score based on the relevance of the matrix generated. The score obtained is based on a comparison between the rules created and the category tree. The process of classifying issues in a chat helps the agent to respond to customer queries quickly and transfer the issues to the concerned department appropriately.

Sentiment analyzer (see, for example, U.S. patent application Ser. No. 13/461,631, filed May 1, 2012, which application is incorporated herein in its entirety by this reference thereto). The sentiment analyzer disclosed herein identifies sentiment polarity from social media text and chats and provides a sentiment strength score for the given input text. Said sentiment analyzer can be used for both chats and social media texts, and can be used even if there is no sentiment-tagged dataset available for chats.

The herein disclosed sentiment analyzer uses a supervised approach using labeled data. A set of tweets (typically 1000-3000) are manually tagged/labeled as negative and positive sentiment tweets. The negative sentiment associated with each of the words is determined by calculating its normalized likelihood on negative tweets. The same is done for positive sentiments associated with a word based on the likelihood to occur in a positive tweet. A Bayesian model is used to calculate the negative sentiment of the sentence by combining the individual word's sentiment scores. The model uses unigrams and bi-grams as features.

An unsupervised approach is also applied, using open-source sentiment dictionaries, such as SentiWordNet 3.0 (a WordNet based dictionary for words and sentiments), SentiStrength's slang terms dictionary (a dictionary for words and slang terms commonly used in social texts), and SentiStrength's emotion-icons dictionary (a dictionary for emotion icons used in social texts and chats).

In an embodiment, this works as follows:

Step 1: The open source dictionaries provide a sentiment score for each of a list of words, which typically are used to express a sentiment.

Step 2: In the corpus being analyzed for sentiment, the words that are part of the sentiment dictionary are identified and their score is obtained.

Step 3: The scores for all these sentiment words in a document or a tweet are summed up to provide a sentiment score for that particular document or tweet.

Step 4: This score can now be normalized by dividing by the total number of words in the document.

Figure 4:
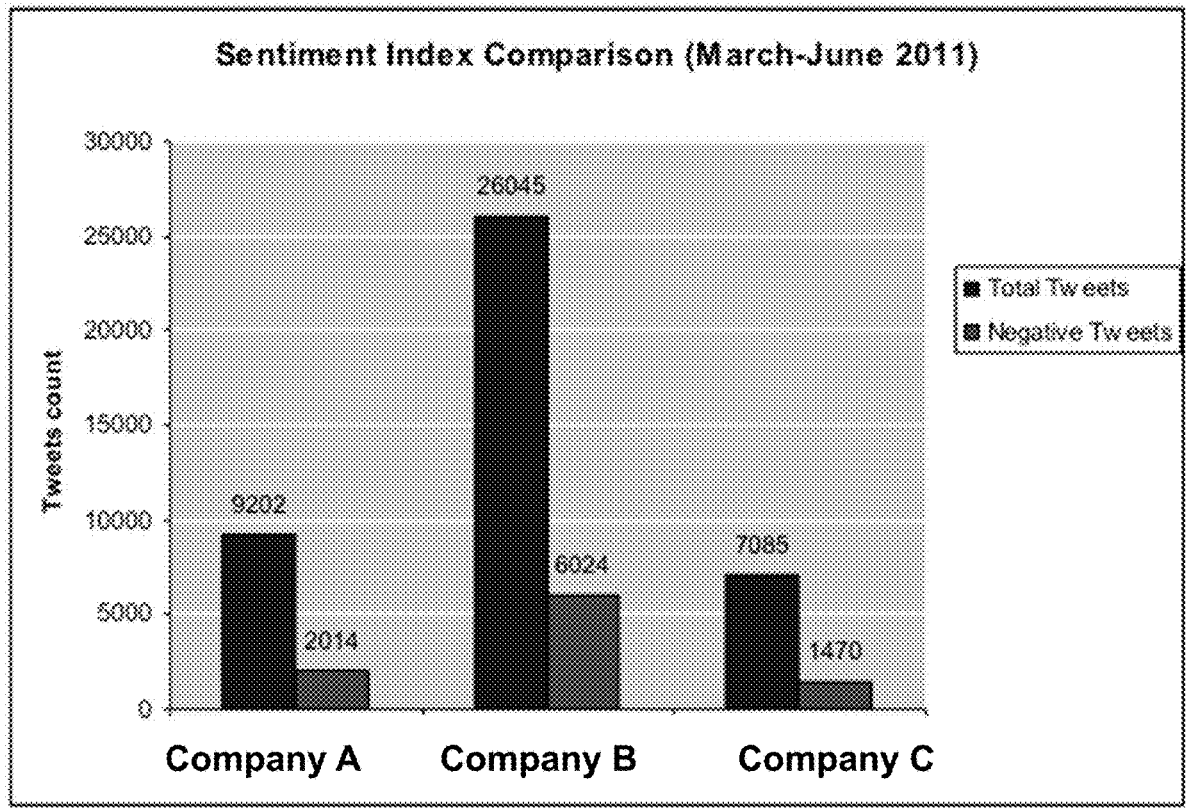
FIG. 4 is a graph that shows a competitors' sentiment analysis produced according to the invention.

FIG. 4 is a graph that shows a competitors' sentiment analysis produced according to the invention, and FIG. 5 is a graphic illustration that shows topic-level sentiment capturing in Twitter along a sentiment score scale.

This aspect of the invention provides a snapshot of consumer sentiment across a broad range of issues that may affect a merchant. This scale is produced in this particular case by assuming each positive or negative term to be equivalent, i.e. each positive term has a score of 1 and each negative term has a score of −1. Then the score is calculated as (#Positive terms−#Negative terms)/(#Positive terms+#Negative terms).

Agent performance models (see, for example, U.S. patent application Ser. No. 13/161,291, filed Jun. 15, 2011, which application is incorporated herein in its entirety by this reference thereto); and Social media mining driven topic and sentiment models (see, for example, U.S. patent application Ser. No. 13/461,631, filed May 1, 2012, which application is incorporated herein in its entirety by this reference thereto).

The above Anticipate, Simplify, and Learn (ASL) framework is leveraged by the availability of big data where customers' footprints are left behind in every interaction with the company because all customers are voting continuously and letting their opinions be known through clicks on the company's websites, their likes and recommendations in their social networks, their responses to administered surveys, their conversations with contact center agents in chats, their voice transcripts, etc. Examples of a customer session include the airlines examples above. Using the system to anticipate, the customer intent is known and, based on this learning, the system provides a best possible approach to interact with the customer or simplifies the customer's interaction.

In an embodiment of the invention, the ASL framework provides a closed-loop system that continuously learns from data to anticipate customer needs and to simplify their interaction better every time. Various data about a visitor and his interaction with a medium are gathered. For example, if we consider online interactions, i.e. via the Web, then data such as the IP, country, time of visit, day of visit, attributes of browser used, among other things, constitute data about the visitor, while data such as pages visited, pages where the customer spends relatively more time, the pages on which the customer prefers assistance, etc. constitute data about the customer's interactions. This data is used to model the customer's behaviour and preferences for interaction. Modelling customer behaviour falls under the agenda of anticipating his needs. Once the models identify his needs, another set of models trained to predict his preferences for interaction to simplify his interaction. For example, the former set of models might recognize that a visitor to a banking website needs clarification on his credit card bill amount, while the latter set of models might suggest that having the customer service call him, rather than chatting with him would make for a good experience for this particular customer. Embodiments of the invention use various statistical and machine learning models to achieve these purposes.

The environment in which the models run make for a closed loop system. When a model predicts something, either as part of anticipating or simplifying, it also records from subsequent interactions of the visitor whether the prediction is correct or not. These recorded responses are then automatically used to modify and/or improve the models by reinforcing the mechanisms internal to the model that have led to correct predictions and penalizing mechanisms that have led to incorrect predictions. This serves as a feedback loop for the model. Thus, by continually observing incoming stream of data about visitors the models have the capability to improve over time.

Figure 6:
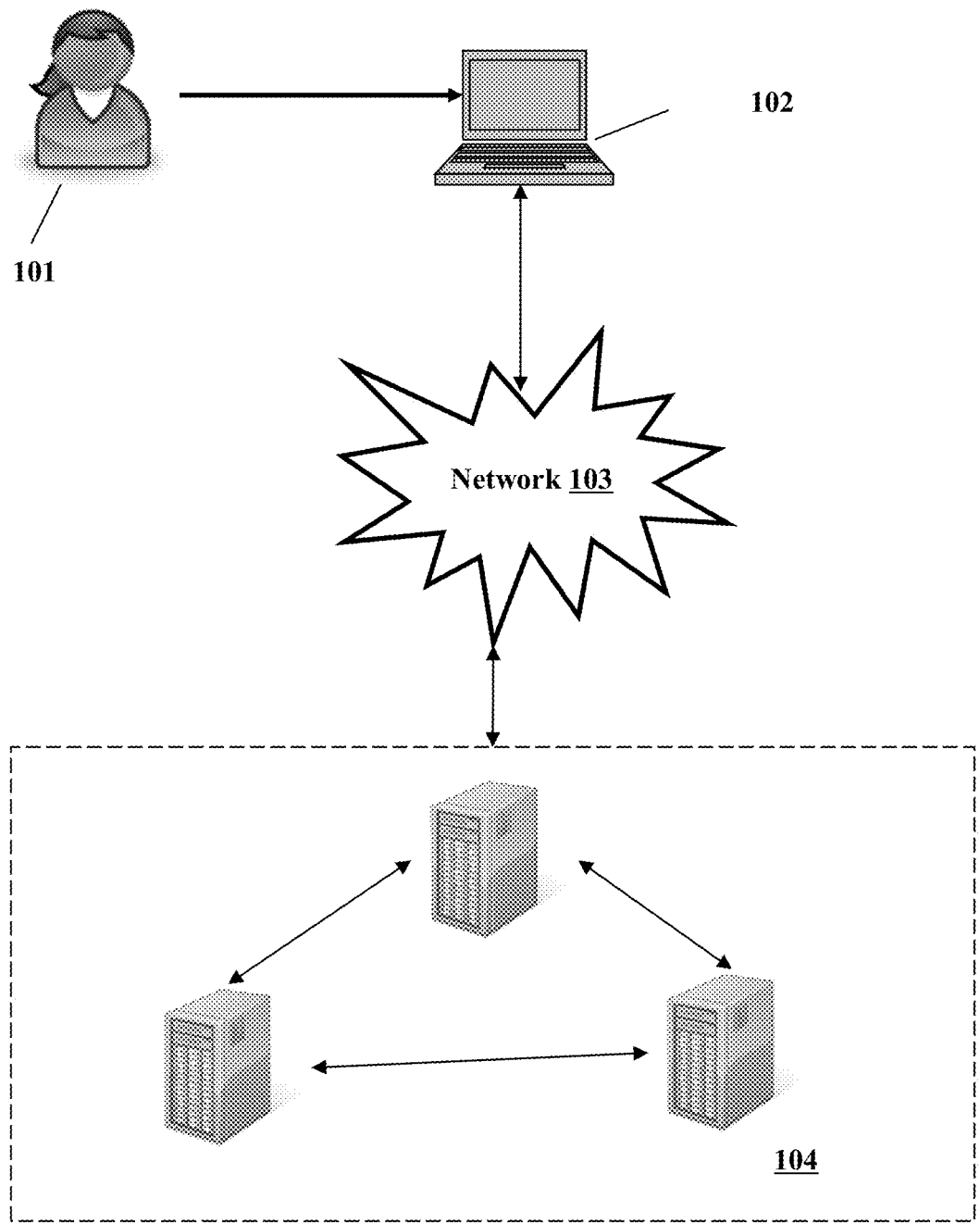
FIG. 6 is a block schematic diagram that depicts an environment for customer interaction according to the invention.

FIG. 6 is a block schematic diagram that depicts an environment for customer interaction according to the invention. In FIG. 6, a visitor or a prospective customer 101 interacts with a network of servers 104 using a suitable medium, such as the Internet, via a client device 102. The visitor 101 may interact with the servers 104 during while accessing a Web site hosted on the plurality of servers 104.

Figure 7:
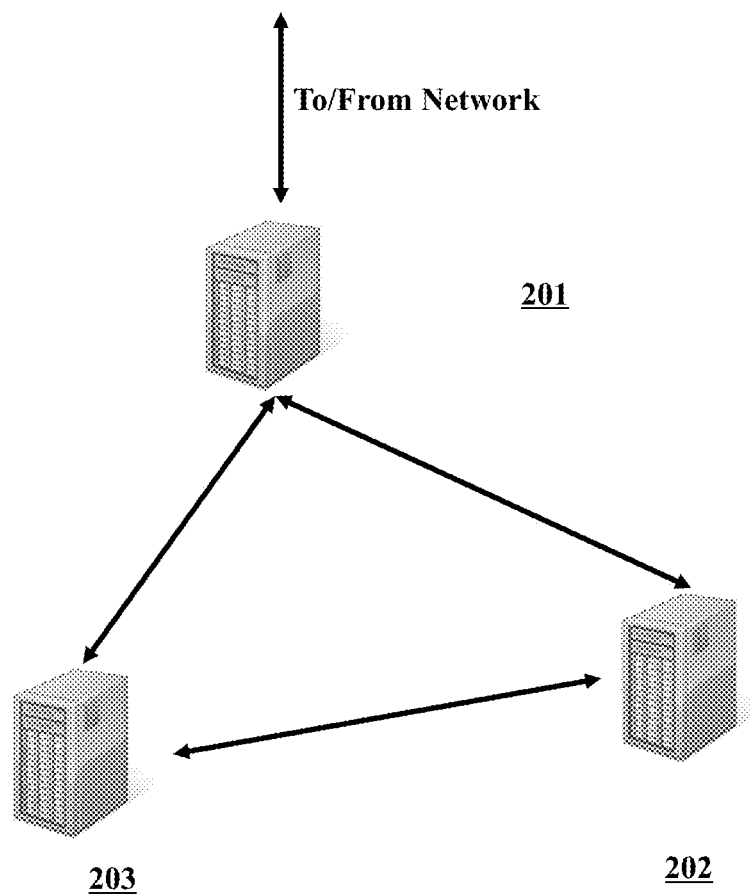
FIG. 7 is a block schematic diagram that depicts a network of servers in an environment for customer interaction according to the invention.

FIG. 7 is a block schematic diagram that depicts a network of servers in an environment for customer interaction according to the invention. In FIG. 7, the network of servers 104 comprises a server 201, which may be a Web server or an application server, an application level database server 202, and an Anticipate-Simplify-Learn (ASL) engine 203. In various embodiments, the ASL engine 203 may be co-located with the Web server or application server 201. The server 201 hosts an application, which may be a Web-based application, to visitors 101 via the client machine 102 via the network. In a presently preferred embodiment, the server 201 is connected to at least one database server 202 and an ASL server 203 to implement the ASL framework.

Figure 8:
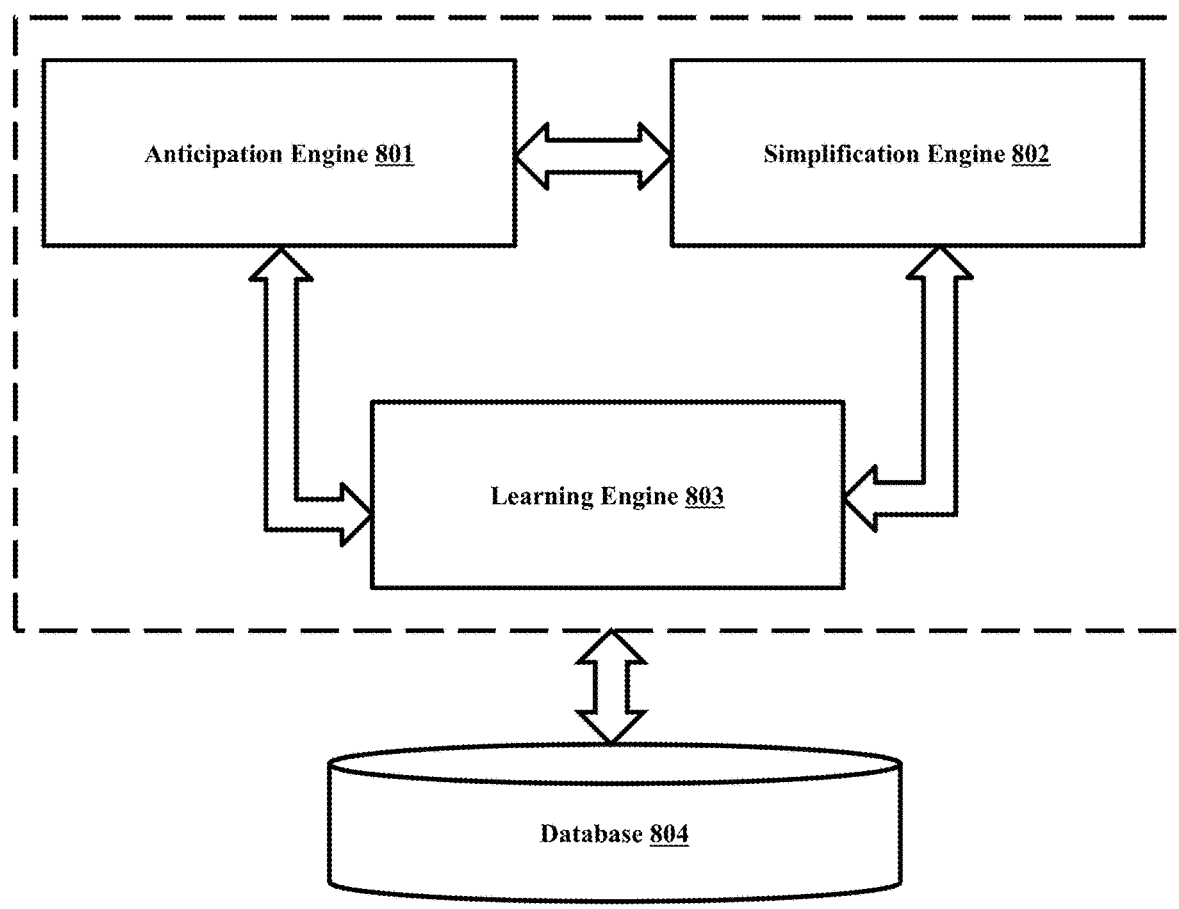
FIG. 8 is a block schematic diagram that depicts an anticipate-simplify-learn (ASL) engine according to the invention.

FIG. 8 is a block schematic diagram that depicts an ASL engine according to the invention. In FIG. 8, the ASL engine 203 comprises an anticipation engine 801, a simplification engine 802, and a learning engine 803. The ASL engine 203 may also comprise a database for storing information that relates to predictive analysis and modeling performed by the various engines 801, 802, and 803. In various other embodiments, the database 804 and the database 202 may be co-located.

The anticipation engine 801 provides a processor for anticipating and/or predicting a customer's intent when the customer visits a website of interest, for example as and when the customer interacts with the system. Examples of intent may include purchasing a class of books, a customer service request, obtaining product information, and so on. Those skilled in the art will appreciate that many types of intent can be anticipated and/or predicted. The foregoing examples are provided for purposes of illustration, and not for limitation.

Based on anticipated intent of the customer, the best possible engagement modes are analyzed and identified by the simplification engine 802 to simplify the customer's experience by driving the system towards an intuitive customer experience in a dynamic manner, e.g. through real-time analysis it incorporates a modeling engine which provides models to target the right visitors at the right time by offering intervention strategies in the form of personalized recommendations and suitable multichannel support to increase purchase propensity, enhance the self-service experience, reduce the deflection rate, or some other suitable business metrics. The modeling engine may use models such as Markov models of higher orders combined with Neural Network, Support Vector machine, Collaborative filtering, Sequential Pattern methods, Survival Analyses, and similar tools. Based on a partial navigational path, i.e. the sequence of pages visited by the customer, the modeling engine models the next action of the visitor as the visitor performs the journey, and at each stage, the modeling engine decides what appropriate pre-emptive action and/or engagement strategy can be taken to maximize the metrics of interest, such as conversion rate or resolving the visitor's problems (resolution rate). The modeling engine may perform design of experiments (DoE) and/or combinatorial optimization for identifying suitable engagement strategies. The modeling engine computes channel affinity for each couplet, such as affinity towards chat engagement, affinity towards using self-help, seeking help thru FAQ's, telephone calls, and so on by computing a channel friction score. The channel friction score can be computed based on the response to various channel supports offered to the visitors after performing the analysis of DoE's and selects a suitable engagement strategy, such as chat offer, email, calls, and so on, based on the computed channel friction score.

The modeling engine may also select an appropriate time to trigger the engagement strategy, based on a plurality of factors comprising, but not limited to, the time and/or time range that the visitor spends on a Web page in the domain. For example, the modeling engine may select a suitable page in the navigation path and time delay on the particular page for triggering a chat-based engagement strategy so that the visitor is likely to accept the chat offer and, consequently, this leads to an increased chat offer acceptance rate. The modeling engine may also select more than one engagement strategy. The engagement strategy could be any of, but not limited to, offering personalized recommendations; offering a better mode of multichannel support, e.g. at least one of proactive chat, reactive chat, voice-based media, self service media, or any other suitable interactive medium; and offering discounts and promotional offers. For example, consider a customer who visits multiple pages related to a product and/or issue. In this case, the modeling engine may suggest interesting products and/or issue resolution solutions based on segmentation and the Web journey of the customer. In another example, for a customer having a high bounce rate and low page visits, the modeling engine may offer chat services as the engagement strategy. One of the primary reasons for selecting the chat engagement as a preferred mode of Web support over the traditional call centers is that it reduces the customers wait time, as well as substantially reducing the cost incurred in call centers. In a third example, for a visitor who exhibits specific transaction features, such as visiting cart and/or purchase pages quickly in the session, the modeling engine may suggest a customized chat and/or self-help widget offering as the engagement strategy to drive the customer to make the purchase.

In an embodiment, simplification of the customer experience is achieved through a design of experiments (DoE) framework and is dependent on knowledge about, for example, the customer, customer intent through anticipated intents, current engagement, any customer service issue involving the customer, and so on. This knowledge is stored in the database which includes current customer journey, Weblogs, Social Media, past interactions, etc. Given this knowledge, the design of experiments framework runs a set of experiments based on a combination of, for example, different experiences, different channels, and nature of assistance, e.g. no assistance, with assistance, specific modes of assistance, and so on. (see, for example, U.S. patent application Ser. No. 13/239,195, filed Sep. 21, 2011, which application is incorporated herein in its entirety by this reference thereto). In an embodiment, the simplification engine 302 achieves an intuitive customer experience by minimizing customer effort involved in an engagement. Such simplification results in a reduction of customer effort during an engagement. Such reduction of customer effort is reflected, for example, in one or more of the following aspects:

Time in the current journey;
Number of interactions and/or contacts required;
Language used in the interaction to display frustration, ease of interaction, etc.;
Relative complexity of the issue resolved; and
Comparison relative to benchmark.

The learning engine 803 updates various models with new information obtained from new customer interactions with the system to provide a better experience to the customer. This includes a feedback mechanism, wherein the data related to a visitor, the engagement strategy chosen, and the outcome and/or response is analyzed and used for further refining the process, as disclosed above. In an embodiment, learning is based on models that include, for example, text mining based issue categorization, sentiment analysis, agent performance models, and social media mining driven topic and sentiment models.

Figure 9:
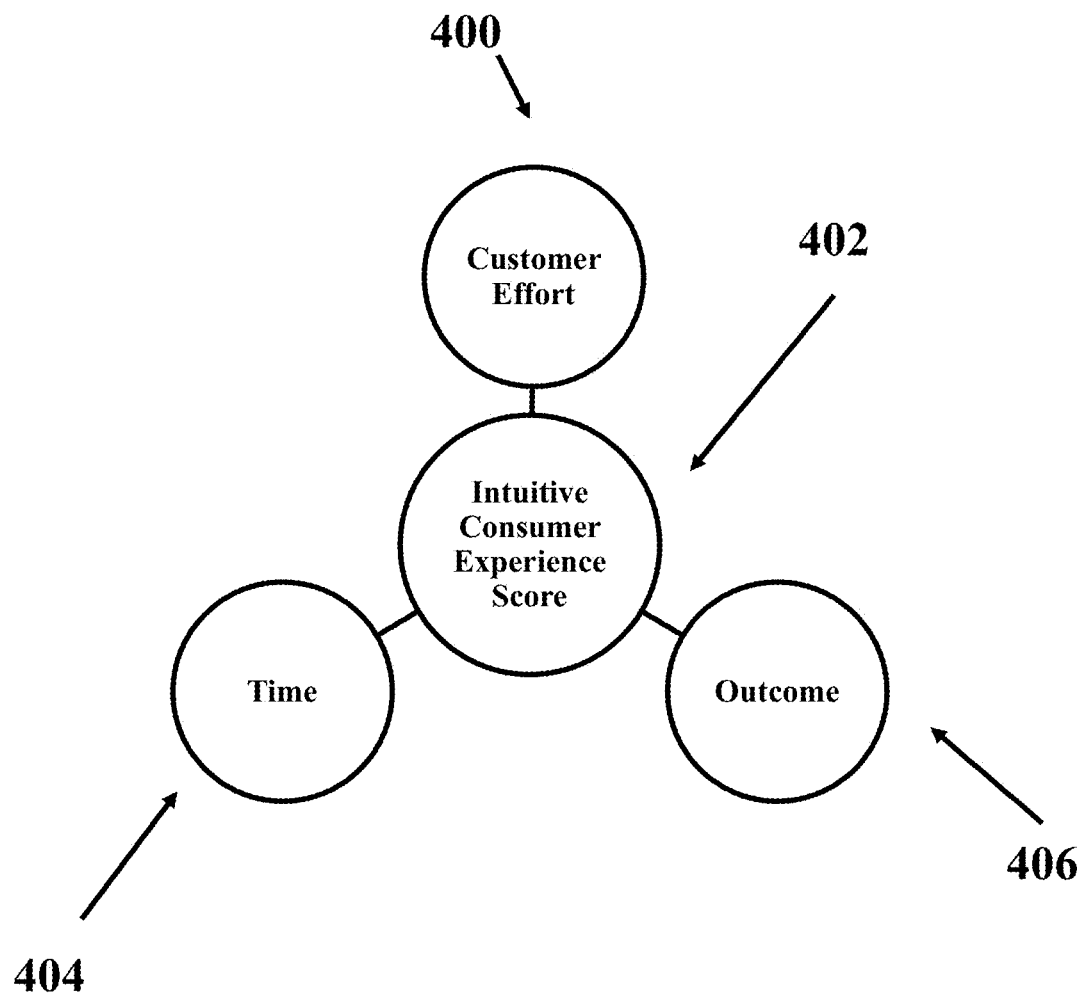
FIG. 9 is a block schematic diagram that depicts a model for customer experience score according to the invention.

In an embodiment, the ASL engine 203 uses a customer experience score to measure, compare, and improve models. FIG. 9 is a block schematic diagram that depicts a model for customer experience score according to the invention. In FIG. 9, an example model for a customer experience score 402 incorporates measures of customer effort involved in an engagement 400, time spent on the engagement 404, and outcome of the engagement 406. The consumer experience score is developed as a statistical model that is a function of these there parameters, where the customer effort score is measures as a function of how long resolution took, how many channels, and how many contacts it took for resolution. The outcome is usually a sentiment or a survey score such as net promoter score, customer satisfaction score, etc.

Computer Implementation

Figure 10:
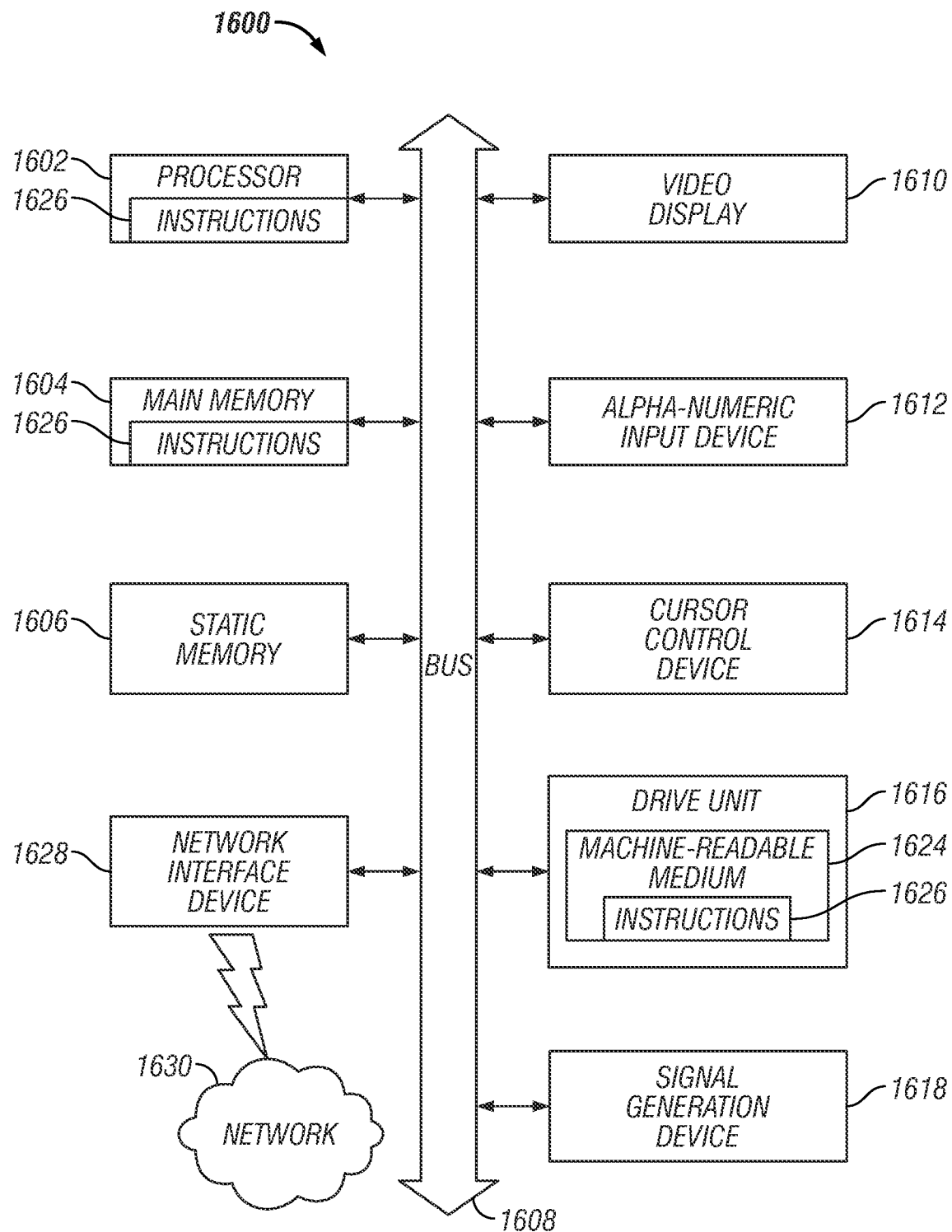
FIG. 10 is a block schematic diagram that depicts a machine in the exemplary form of a computer system within which a set of instructions for causing the machine to perform any of the herein disclosed methodologies may be executed.

FIG. 10 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method, implemented in a computer system comprising a processor and a memory, for reducing a time of navigation or number of interactions to navigate through an online commerce system, comprising:
    anticipating, by an anticipation engine, a target action to be taken by a first user with an online commerce system engine based on a machine learned model of recorded past interaction by the first user with the online commerce system using a set of current system conditions, the recorded past interaction including navigation choices between pages on the online commerce system;
    generating, by a simplification engine, a new navigation path between a first page on the online commerce system and a second page on the online commerce system, the second page including the target action, wherein the new navigation path is supported by a direct link embodied by a user interface object in the online commerce system, wherein the new navigation path navigates between the first page and the second page in a single click skipping any intermediate pages, and wherein all other navigation paths between the first page and the second page prior to said generating of the new navigation path and the direct link required users to visit other intermediate pages;
    integrating the user interface object to an instance of the user interface associated with the first user;
    measuring, by a learning engine, a user effort criteria for the first user, wherein the user effort criteria is measured using any of: time in a current online navigation path or number of interactions relative to a benchmark; and
    continuously updating, by the learning engine, the machine learned model interaction taken by the first user with the online commerce system under system conditions including: user IP, country, time of visit, day of visit, attributes of browser used, and any interaction taken by the first user with respect to the user interface object.

2. The method of claim 1, wherein the target action is reaching a particular section of a website.

3. The method of claim 1, said measuring including evaluation of customer interface, and a design of experiment (DoE) framework that performs statistical experiments to on effectiveness of the user interface object.

4. The method of claim 1, said updating further based on text mining-based issue categorization, sentiment analysis, agent performance models, and social media mining driven topic and sentiment models.

5. The method of claim 1, said recorded past interaction comprising any of clicks on a company's website, first user likes and recommendations in the first user's social networks, first user responses to administered surveys, first user conversations with contact center agents in chats, and first user voice transcripts.

6. The method of claim 1, wherein said simplification engine is implemented via a design of experiments (DoE) framework and is dependent on knowledge about any of said first user, the target action, current engagement, and any customer service issue involving said first user.

7. The method of claim 6, further comprising:
    executing, by the DoE framework, a set of experiments based on a combination of any of different experiences, different channels, and nature of assistance, including no assistance, with assistance, and specific modes of assistance.

8. The method of claim 1, wherein said learning engine is based upon models that comprise any of text mining-based issue categorization, sentiment analysis, and social media mining driven topic and sentiment models.

9. The method of claim 1, wherein the target action is a first target action and the method further comprising:
anticipating by the anticipation engine, a second target action to be taken by the first user with the online commerce system engine based on the machine learned model of recorded past interaction by the first user with the online commerce system using the set of conditions after the first user responds to the first target action; and
generating, by the simplification engine, a second user interface object in the online commerce system that directs the user toward the second target action with more efficient navigation than other multiple paths to the second target action.

10. The method of claim 1, wherein the machine learned model comprises any of Markov models of higher orders combined with Neural Network, Support Vector machine, Collaborative filtering, Sequential Pattern methods, and Survival Analyses.

11. The method of claim 6, further comprising:
said DoE framework computing a channel affinity for each of a plurality of couplets by computing a channel friction score, said couplets comprising any of affinity towards chat engagement, affinity towards using self-help, seeking help thru FAQ's, and telephone calls;
said DoE framework computing said channel friction score based on a response to one or more channel supports offered to the customer after performing an analysis of DoE's; and
based on the computed channel friction score, said processor selecting an engagement strategy, said engagement strategy comprising any of a chat offer, email, and telephone calls.

12. The method of claim 6, further comprising:
said DoE framework selecting a time to trigger an engagement strategy, based on a plurality of factors comprising any of time and/or time range that the customer spends on a Web page in a domain.

13. The method of claim 12, further comprising:
identifying, by said DoE framework, a page in the customer's navigation path and time delay on a particular page in which a chat-based user interface object is generated, wherein the model of past recorded behavior indicates the first user is likely to accept the chat offer and wherein a chat offer acceptance rate is increased.

14. The method of claim 12, further comprising:
selecting, by said DoE framework, multiple content of the user interface objects comprising any two or more of: offering personalized recommendations, offering a better mode of multichannel support comprising at least one of proactive chat, reactive chat, voice-based media, and self-service media, and offering discounts and promotional offers.

15. The method of claim 12, further comprising:
Suggesting, by said DoE framework, products and/or issue resolution solutions based on segmentation and the Web journey of the first user.

* * * * *